United States Patent
Archer, Jr.

(10) Patent No.: US 6,888,691 B2
(45) Date of Patent: May 3, 2005

(54) APPARATUS AND METHOD FOR ISOLATING OPTICS FROM THERMAL EXPANSION

(75) Inventor: Carl Douglas Archer, Jr., Louisville, KY (US)

(73) Assignee: Thomson Licensing S. A., Boulogne-Billancourt (FR)

( * ) Notice: Subject to any disclaimer, the term of this patent is extended or adjusted under 35 U.S.C. 154(b) by 136 days.

(21) Appl. No.: 10/406,550

(22) Filed: Apr. 3, 2003

(65) Prior Publication Data

US 2004/0196439 A1 Oct. 7, 2004

(51) Int. Cl.[7] .............................................. G02B 7/18
(52) U.S. Cl. ................... 359/831; 359/832; 359/833
(58) Field of Search ............................. 359/831–833; 353/20, 33–37

(56) References Cited

U.S. PATENT DOCUMENTS

| | | | | |
|---|---|---|---|---|
| 5,537,171 A | * | 7/1996 | Ogino et al. ................ | 353/122 |
| 5,844,637 A | * | 12/1998 | Katsumata .................. | 349/8 |
| 6,183,090 B1 | * | 2/2001 | Nakanishi et al. ............ | 353/20 |
| 6,343,864 B1 | * | 2/2002 | Tajiri ........................... | 353/20 |
| 6,789,902 B2 | * | 9/2004 | Hayashi et al. .............. | 353/20 |

* cited by examiner

*Primary Examiner*—Mohammad Sikder
(74) *Attorney, Agent, or Firm*—Joseph S. Tripoli; Harvey D. Fried; Patricia A. Verlangieri

(57) ABSTRACT

An apparatus that reduces convergence and focus drift in imager prism assemblies includes at least one assembly having a first side and a second side. The first side communicates with a first isolator inner surface and a second side communicates with a second isolator inner surface. An outer surface of the first isolator communicates with a first member of a frame. An outer surface of the second isolator communicates with a top side of a damping member. A bottom side of the damping member communicates with a second member of the frame. There is at least one guide pin located through the first isolator and the first member.

A first adhesive secures the first side to the first isolator inner surface and the first adhesive secures the second side to the second isolator inner surface. A second adhesive secures the first isolator outer surface to the first member and the second adhesive secures the second isolator outer surface with the top side. A third adhesive secures the bottom side to the second member and a bottom end of the first and second isolator communicates with a plate.

11 Claims, 2 Drawing Sheets

APPARATUS AND METHOD FOR ISOLATING OPTICS FROM THERMAL EXPANSION

FIELD OF THE INVENTION

This invention relates to imagers in liquid crystal on silicon (LCOS) light engines and more particularly, to an application that isolates prism assemblies from thermal expansion reducing convergence and focus drift.

BACKGROUND OF THE INVENTION

Liquid crystal displays (LCDs) are becoming increasingly prevalent in high-density projection display devices. These conventional high density projection color display devices include a light source which emits white light. Dichroic mirrors separate the white light into its corresponding red, green and blue (RGB) bands of light. These color bands of light are then directed toward a corresponding liquid crystal valve which either permits or prevents the light transmission. The RGB bands of light which are permitted to be transmitted through the light valves are then combined by a prism assembly. A projection lens then magnifies and projects the image onto a projection screen.

A conventional liquid crystal plate comprises lens arrays, a lens for collecting white light from a source and dichroic mirrors for separating the white light into red light, green light and blue light. A polarizing beam splitter (PBS) separates the s-polarized-light components of the red, green and blue range. It allows the separated s-polarized-light components of the light to project on reflex crystal plates and a cross dichroic prism for synthesizing the image lights of p-polarized-light components. The p-polarized-light components are modulated and reflected to be output. A projection lens projects the image light on a screen.

In the current form of the technology, the imager prisms in liquid crystal on silicon (LCoS) light engines are mounted in a precise manner about the prism assembly to aluminum plates that expand or contract with thermal change. The thermal flexing of these plates pushes the sensitive prism alignment out of the focal plane and mis-converges the imager prisms to one another.

The liquid crystal display device described in U.S. Pat. No. 5,537,171, entitled "Liquid Crystal Projection Display" to Ogino et el., is confined to a liquid crystal panel means, a projection lens means and a screen means that enhances relative corner illuminance without reducing light capturing efficiency. However, the display device does not reduce the convergence and focus drift of its prism assembly due to thermal fluxing.

The liquid crystal projector described in U.S. Pat. No. 6,343,864, entitled "Liquid Crystal Projector Equipment" to Tajiri, is confined to mounting polarizing beams splitters (PBS) in the manner where the PBS is mounted about a prism quad assembly to aluminum plates that flux with thermal change. This arrangement produces convergence and focus drift of its prism assembly where there is thermal change.

What is needed is an apparatus that will isolate sensitive optics from the thermal fluxing produced in all the imagers in LCoS light valves.

SUMMARY OF THE INVENTION

An apparatus that reduces convergence and focus drift in imager prism assemblies includes at least one prism assembly having a first side and a second side. The first side communicates with a first isolator inner surface and a second side communicates with a second isolator inner surface. The first and second isolator reduce the convergence and focus drift of the prism assembly. An outer surface of the first isolator communicates with a first position of a frame for mounting the prism assembly. An outer surface of the second isolator communicates with a top side of an damping member for reducing the thermal flexing effects on the frame. A bottom side of the damping member communicates with a second position of the frame for mounting the prism assembly. There is at least one guide pin at each prism assembly located through the first isolator and the first position for initial alignment of the prism assembly.

A first adhesive secures the first side to the first isolator inner surface and the first adhesive secures the second side to the second isolator inner surface. A second adhesive secures the first isolator outer surface to the first position and the second adhesive secures the second isolator outer surface with the top side. A third adhesive secures the bottom side to the second position and a bottom end of the first and second isolator communicates with a plate to further reduce the convergence and focus drift of the prism assembly.

BRIEF DESCRIPTION OF THE DRAWINGS

The invention will now be described with reference to accompanying figures of which.

DETAILED DESCRIPTION OF THE PREFERRED EMBODIMENT

While the present invention is described below with reference to an imager for a LCoS light engine, a practitioner in the art will recognize the principles of the present invention are applicable elsewhere.

Figure 1:
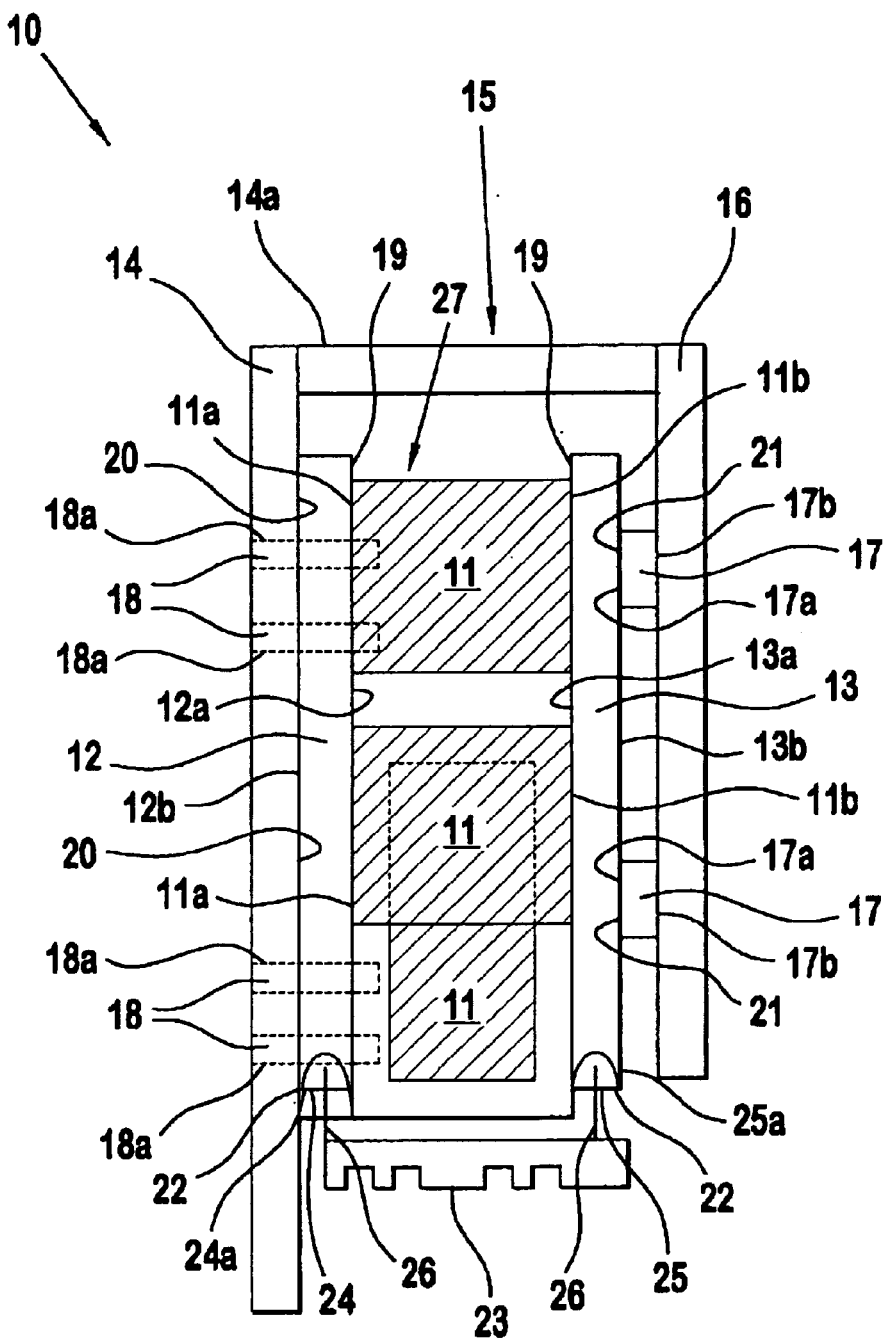
FIG. 1 is a detailed view of the imager prism in the preferred embodiment of the invention.

FIG. 1 illustrates apparatus 10 as an embodiment of the invention. Apparatus 10 reduces the convergence drift and focus drift in imager prism assemblies resulting from thermal flexing of the device. When the metal frame 15, where the imager prism assemblies 11 are mounted, expands or contracts due to thermal changes in the metal frame, the prism assemblies 11 become misaligned. The metal frame includes the first member 14, the second member 16, a tie member 14a which secures the first member 14 to the second member 16 and a plate 23. Typically, frame 15 is constructed of aluminum which has a high coefficient of expansion and thermally flexes in temperature cycling. The expansion and/or contraction of the frame 15 pushes the sensitive alignment of the prisms out of the focal plane and misconverges the imager prisms with respect to one another. By the addition of a first isolator 12 and a second isolator 13, the prism assembly 11 is isolated from thermal expansion or contraction. It drastically reduces the convergence drift, the focus drift and improves color uniformity in the final output of apparatus 10.

At least one polarizing beam splitter (PBS) prism assembly 11 having a first side 11a and a second side 11b is mounted in apparatus 10. In FIG. 1, there are three PBS prism assemblies 11 mounted. As is known by the practitioner in the art, the number of (PBS) prism assemblies in apparatus 10 will depend on the application. The first side 11a communicates with a first isolator 12 at the first isolator inner surface 12a. The second side 12b communicates with a second isolator 13 at the second isolator inner surface 13a. The prism assembly 11 first side 11a is secured to the first isolator inner surface 12a by a first adhesive 19. Concurrently, the prism assembly 11 second side 11b is secured to the second isolator inner surface 13a by a first adhesive 19. The prism assembly 11 communicating directly with the first isolator 12 and the second isolator 13, instead of the frame 15, reduces the convergence drift and focus drift that is present when there are thermal changes (expansion/contraction) in apparatus 10 as described in further detail below.

Typically, the first isolator 12 and the second isolator 13 are glass plates that isolate the imager mounts 27 from the flexing metal of frame 15. Alternately, glass is substitutable for any amorphous material with a low coefficient of expansion. For example, glass plates could be provided that contain a mixture of silicates, soda and lime, or glass plates could be used that contain a mixture of silicates, soda, lime and metal oxides. In one embodiment, ceramic material is used for the first structure 12 and the second structure 12 instead of glass. In yet other embodiments a lead-borosilicate or a bismuth-based glass is used for the first and second isolator.

Figure 2:
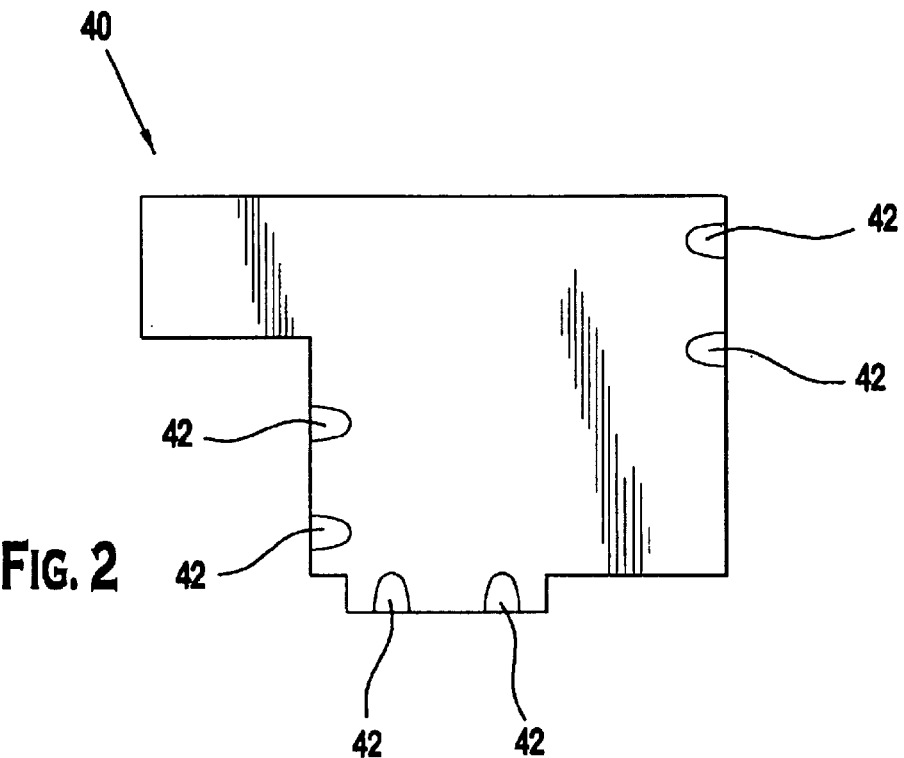
FIG. 2 is a top view of an alternate first and second isolator design in the preferred embodiment of the invention.
Figure 3:
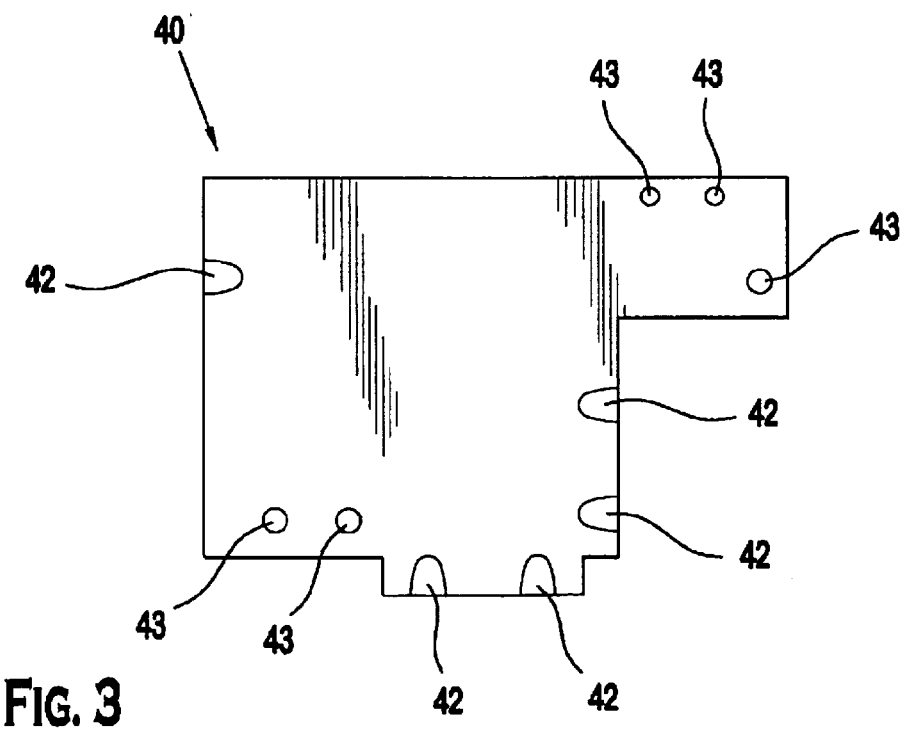
FIG. 3 is a bottom view of an alternate first and second isolator design in the preferred embodiment of the invention.

The size and shape of the first isolator 12 and the second isolator 13 varies depending on the application. FIGS. 2 and 3 illustrate a glass isolator 40 which is one embodiment of the first isolator 12 and the second isolator 13. Alternately, different embodiments of the glass isolator 40 take on different shapes depending on the design of apparatus 10.

Referring to FIG. 1, a first isolator 12 by the first isolator outer surface 12b communicates with a first member 14 of a frame 15 to mount the prism assembly 11. Concurrently, a second isolator 13 by the second isolator outer surface 13b communicates with a top side 17a of a damping member 17. This arrangement in apparatus 10 reduces the thermal effects from the frame 15 which includes the first member 14, the tie member 14a, the second member 16 and the plate 23. A second adhesive 20 secures the first isolator outer surface 12b to the first member 14 and secures the second isolator outer surface 12b to the top side 17a of the damping member 17.

At least one guide pin 18 is positioned in a guide pin hole 18a at each prism assembly 11. The guide pin holes 18a are routed through the first member 14 of frame 15, the first isolator 12 and slightly into the prism assembly 11 at the first side 11a. The guide pins 18 are positioned in and through the guide pin holes 18a so as to engage with the first side 11a of the prism assembly 11. The guide pins 18 indent into the first side 11a of the prism assembly 11. The guide pins 18 are positioned to provide an initial alignment of the prism assembly 11 while the first adhesive 19, the second adhesive 20 and the third adhesive 21 are curing. As is known by the practitioner in the art, the guide pin 18 and the guide pin hole 18a are built so as to securely position the initial alignment of the prism assembly 11. This allows the adhesives to cure fixing the position of the prism assembly 11.

A third adhesive 21 secures the bottom side 17b of the damping member 17 to the second member 16 of frame 15.

A first isolator bottom end 24 and a second isolator bottom end 25 communicate with a plate 23 which supports an imager. This further reduces the convergence drift and focus drift of the prism assembly 11 because plate 23 is mounted directly to the first isolator 12 and second isolator 13. In the prior art the plate 23 was mounted directly to the frame 15. The first isolator bottom end 24 contains a first cavity 24a. The second isolator bottom end 25 contains a second cavity 25a. The first and second cavities contain a fourth adhesive 22 surrounding mounting pins 26 that are secured to the plate 23. The mounting pins 26 are immersed in the fourth adhesive 22 to securely hold the imager mounts 27.

Typically, the frame 15 and the plate 23 material is aluminum. Alternately, aluminum is substitutable for other metals including, but not limited to, copper, cooper alloys or the like. As is known by the practitioner in the art, the shape of the frame 15 and plate 23 depends upon the application.

The damping member 17 in the preferred embodiment of the invention is rubber. However, the practitioner in the art understands that rubber is substitutable for a variety of other materials that exhibit similar thermal, elastic and expansion properties as rubber. For example, one embodiment of the invention uses plastic as the damping member 17.

The first adhesive 19, a hard material, will precisely mount the prism assembly 11 to the first and second isolators 12, 13. One such adhesive is an ultraviolet light curable anisotropic adhesive with good glass to glass bonding properties. Typically, the amount of the first adhesive 19 that is applied is an amount that results in an applied thickness of about 12–45 microns. If too much first adhesive 19 is applied to the prism assembly 11, the first isolator 12 or second isolator 13, these components may move laterally and misalignment could occur. On the other hand, if too little first adhesive 19 is applied there will be poor adhesion and an insufficient bonding will occur. This will weaken the strength of apparatus 10.

The second adhesive 20, a pliable material, will fix the first isolator 12 to the frame 15 and the second isolator 13 to the damping member 17. The second adhesive 20 is a pliable (elastic) adhesive at room temperature to allow expansion of the metal to glass bond and the glass to rubber bond. For example, adhesives using as the filler polymers having high glass transition temperature such as polyvinyl acetate with a glass transition temperature of 40C provide the proper bond strength and elasticity when used as the second adhesive 20. Alternately, the polyvinyl acetate is substitutable by other filler polymers including, but not limited to, partially hydrolyzed polyacrytamindes which have a glass transition temperature between about 106C and 165C. The higher the transition temperature of the second adhesive 20 the more the adhesive will allow thermal flexing (expansion/contraction) of the frame 15 without causing misalignment of the prism assembly 11. Consequently, the resulting focus and convergence drift of the prism assembly 11 is reduced.

The third adhesive 21 will fix the damping member 17 to the frame 15. It is important that the rubber to metal bond is as strong as possible and can be maintained over long periods. It is known that the adhesion strength between rubber and metal deteriorates with time due to corrosion of the metal. In the preferred embodiment of the invention, the adhesive composition includes a mixture of a chlorinated rubber, an acrylic polymer, a Lewis acid and an organic solvent. Alternately, the adhesive composition includes a mixture of chlorinated rubber, an acrylic polymer, and/or a hydrocarbon-type polymer having terminal function groups in the molecule and an organic solvent. Yet in another embodiment of the invention the third adhesive 21 is a mixture of a polymer made of chlorinated rubber and an acrylic monomer, a Lewis acid and an organic solvent. As is know by the practitioner in the art, the third adhesive 21 is any adhesive mixture combination selected from the group including, but not limited to, chlorinated rubbers, acrylic monomers, hydrocarbon-type polymers, Lewis acid, organic solvent, polyolefin-type polymers and the like.

The fourth adhesive 22 will fix the frame 15 to the plate 23. It is important that the metal to metal bond is as strong as possible and can be maintained over long periods. It is known that the adhesion strength between metal and metal deteriorates with time due to corrosion of the metal. In the preferred embodiment of the invention, the fourth adhesive 22 is a water dispersed adhesive composed of a copolymer of acrylonnitrile and methacrylate and aphenolic resole. Alternately, this adhesive mixture is substitutable for a solvent based adhesive composed of a phenolic resole, a polyvinylbutyral resin and a multifunctional epoxy, for example, epoxidized phenolic novolae. As is known by the practitioner in the art, the fourth adhesive 22 is any adhesive with strong metal to metal bonding characteristics.

The viscosity of the first, second, third and fourth adhesives should be such that when a component is placed into the uncured adhesive, the adhesive is viscose enough that the adhesive holds the component in the adhesive. The component should be held without substantial lateral movement until the adhesive is cured. The viscosity of the adhesive permits the components to be accurately placed. For example, the first adhesive viscosity must be in a range that will allow the guide pin 18 to accurately align the prism assembly 11 to the first structure 12 and the second structure 13. The position of these components must be maintained until the first adhesive has fully cured. It is desirable to have the viscosity of the adhesives in the range of about 100,000 to 300,000 centipose at 25C.

FIGS. 2 and 3 illustrate a glass isolator 40 as another embodiment of the first isolator 12 and the second isolator 13 used in apparatus 10 that is illustrated in FIG. 1. The glass isolator inner surface 41a contains a variety of pin mounting cavities 42 and prism guide pin holes 43. The number of the pin mounting cavities 42 and prism guide pin holes 43 depend upon the design and application of apparatus 10. The glass isolator outer surface 41b contains a variety of pin mounting cavities 42. The number of the pin mounting cavities 42 depend upon the design and application of apparatus 10.

Referring to FIGS. 1 through 3, there is a method of manufacturing apparatus 10 wherein the apparatus reduces convergence drift and focus drift in imager mount 27 prism assemblies 11. The first step is to provide at least one prism assembly 11 having a first side 11a and a second side 11b. The first side 11a is located to communicate with a first isolator inner surface 12a. A second side 11b is located to communicate with a second isolator inner surface 13a. The first isolator 12 and the second isolator 13 reduce the convergence and focus drift of the prism assembly 11.

The next step includes applying a first adhesive 19 to fix the first side 11a to the first isolator inner surface 12a and applying the first adhesive 19 to fix the second side 11b to the second isolator inner surface 13a.

The third step includes providing at least one guide pin 18 and guide pin hole 18a at each prism assembly 11 located through the first isolator 12, first member 14 and slightly into the first side 11a of the prism assembly 11. This is to engage the guide pin 18 for initial alignment of the prism assembly.

The fourth step is to provide a first isolator outer surface 12b located to communicate with a first member 14 of a frame 15 for fixing the prism assembly 11.

The next step includes applying a second adhesive 20 to secure the first isolator outer surface 12b to the first member 14.

The sixth step provides a second isolator outer surface 13b located to communicate with the top side 17a of a damping member 17 that help to reduce the flexing effects from the expansion/contraction of the frame 15.

The next step includes applying a second adhesive 20 to secure the second isolator outer surface 13b with the top side 17a.

The eighth step includes providing a bottom side 17b of the damping member 17 located to communicate with a second member 16 of the frame 15 to fix the prism assembly 11.

The next step includes applying a third adhesive 21 to secure the bottom side 17b to the second member 16.

The final step includes providing a first isolator bottom end 24 and a second isolator bottom 25 located to communicate with a plate 23 to further reduce the convergence and focus drift of the prism assembly 11.

While there has been illustrated and described what is at present considered to be the preferred embodiment of the invention, it should be appreciated that numerous changes and modifications are likely to occur to those skilled in the art. It is intended in the appended claims to cover all those changes and modifications that fall within the spirit and scope of the present invention.

What is claimed is:

1. An apparatus for reducing convergence and focus drift in imager prism assembly comprising:
   at least one prism assembly;
   a first isolator being fixed to a first side of said prism assembly;
   a second isolator being fixed to a second side of said prism assembly; and,
   a plate being fixed to a bottom end of said first and second isolators and being precisely positioned to said at least one prism assembly.

2. The apparatus as claimed in claim 1 further comprising an imager supported on said plate.

3. The apparatus as claimed in claim 1 further comprising a frame for housing said isolators and said prism assembly.

4. The apparatus as claimed in claim 1 further comprising a first adhesive located on the first and second sides between each isolator and said prism assembly.

5. The apparatus as claimed in claim 3 further comprising a damping member positioned between said second isolator and said frame.

6. The apparatus as claimed in claim 5, wherein said damping member will bias said first and second isolator to said frame.

7. The apparatus as claimed in claim 6, wherein said damping member further comprises at least one rubber pad.

8. The apparatus as claimed in claim 5 further comprising a second adhesive located between said first isolator and said frame and located between said second isolator and said damping member.

9. The apparatus as claimed in claim 5 further comprising a third adhesive located between said damping member and said frame.

10. The apparatus as claimed in claim 1, wherein said bottom end further comprises a cavity containing a fourth adhesive surrounding mounting pins secured to said plate, said mounting pins are immersed in said fourth adhesive.

11. The apparatus as claimed in claim 1, wherein said first and second isolator reduce the affects on said prism assembly from the thermal flexing of said frame.

* * * * *